May 30, 1939.   S. R. MILLAR   2,159,997
QUANTITY INDICATING WRAPPER
Filed Dec. 15, 1937
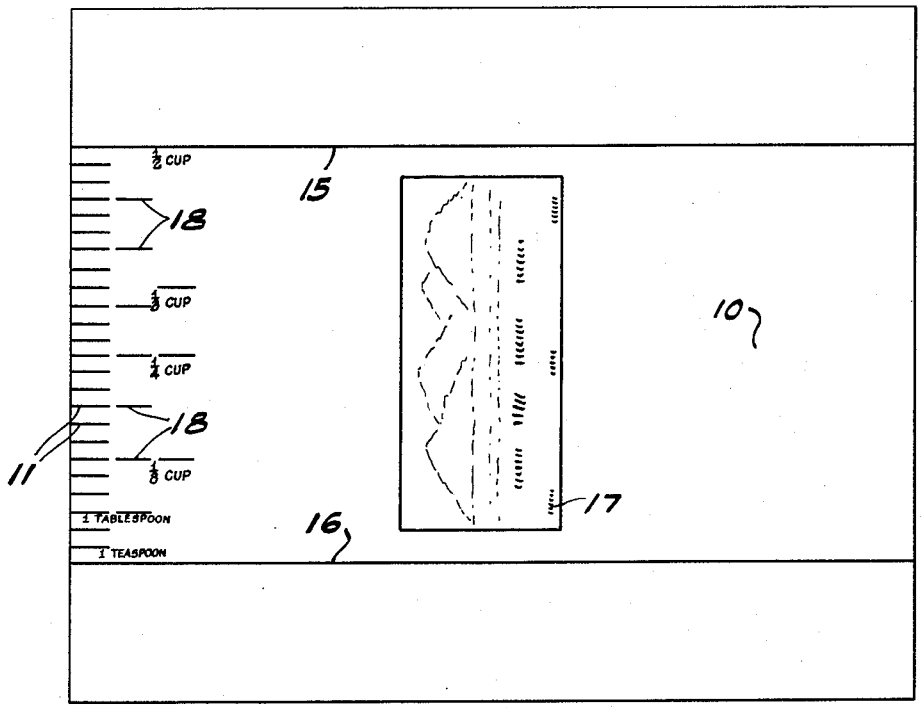
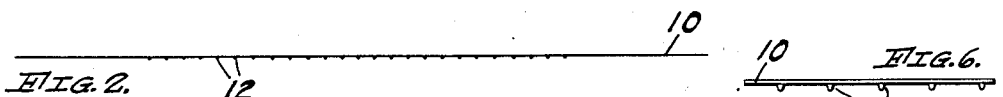
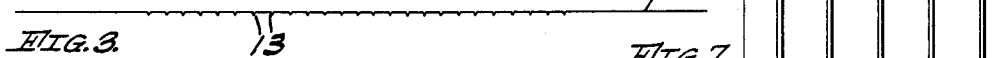
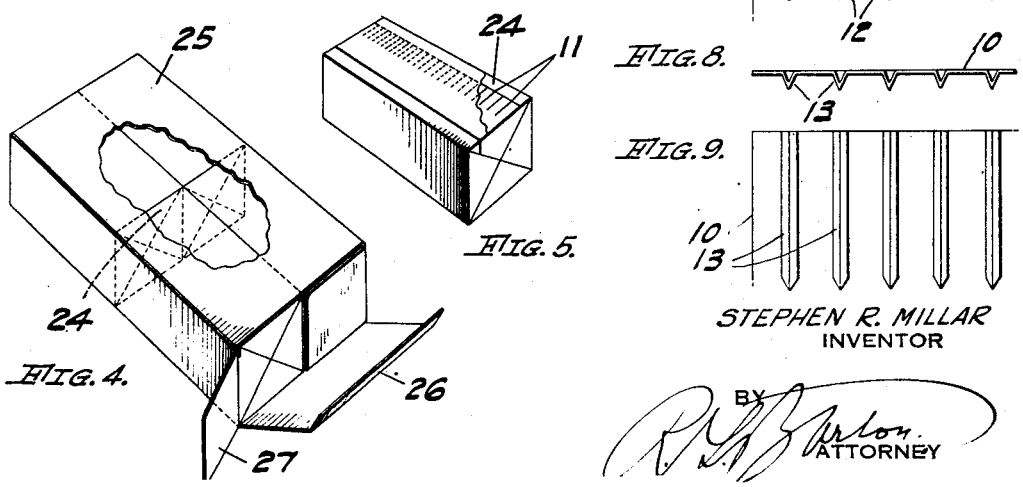
STEPHEN R. MILLAR
INVENTOR
BY
ATTORNEY Patented May 30, 1939

2,159,997

UNITED STATES PATENT OFFICE 2,159,997

QUANTITY INDICATING WRAPPER

Stephen R. Millar, Los Angeles, Calif., assignor of one-half to Alberta J. Millar and one-half to Olive P. McHale, both of Los Angeles, Calif.

Application December 15, 1937, Serial No. 179,913

2 Claims. (Cl. 99—179)

The present invention relates to a means for indicating the lines of severance of fractional or predetermined quantities of material in a cake or bar form.

More particularly the invention relates to an improved wrapper adapted for use in connection with butter cubes wherein indicia is placed on the wrapper indicating the amount and designating on the goods the lines along which the cuts are to take place.

An important object of the invention is to provide in a device of the above character a means for indicating to the chef the amount necessary in cooking in the most economical fashion.

Additional objects include; the provision of improved means to aid in keeping the appearance of butter cubes attractive; the provision of clearer, more convenient and understandable butter-severing indications thus adding a merchandising value by stimulating the use of butter to a greater extent than in the past.

A further object of the invention is to provide a wrapper having on one of its faces tabulated dated and indicating means for serving predetermined quantities and on the opposite face means for designating a line of severance on the goods when the wrapper is removed therefrom.

A still further object of the invention is the provision of a novel and more useful combination of carton, goods and wrapper therefor wherein the wrapper thru the medium of the carton imprints an indicating means on the goods of predetermined quantities to be cut therefrom.

Other objects, advantages and features of invention will hereinafter appear.

Referring to the accompanying drawing which illustrates what is at present deemed to be a preferred embodiment of the invention, Fig. 1 is a plan view showing, in an extended condition, a wrapper of sheet material for butter or other severable substances prepared in cake form, which embodies the invention. This view may be regarded as showing the sheet of either Fig. 2 or of Fig. 3.

Fig. 2 is an end view of the wrapper showing embossed lines on the under face thereof positioned in such a manner as to indicate desired lines of severance of the butter or other substance wrapped within the sheet.

Fig. 3 is a view similar to Fig. 2 except that the cut indicating lines are represented by angular creases in the sheet which forms the wrapper.

Fig. 4 is a perspective view of a carton containing four butter "cubes" which are wrapped individually with wrappers provided by the invention, a portion of the carton being broken away in order to expose the wrapped butter cubes therein.

Fig. 5 is a perspective view of a single butter cube enclosed by a wrapper embodying the invention.

Figs. 6 and 7 are respectively edge and plan views of portions of wrappers illustrating the embossing on a larger scale than that of Fig. 2.

Figs. 8 and 9 are respectively edge and plan views of portions of wrappers illustrating the sheet creases on a larger scale than that of Fig. 3.

Referring in detail to the drawing, partly across one end portion of the wrapper 10 of Fig. 1 is shown a graduated series of cut indicating markings 11 consisting of lines printed thereon by a printing press and being in register with the embossing 12 shown in Figs. 2, 6 and 7 or the creases 13 shown in Figs. 3, 8 and 9, when these features are made use of.

Said markings 11 extend to the edge of the sheet 10 and are confined to the space between the folding lines 15 and 16. They are shown arranged in such a manner as to subdivide the space between said lines 15 and 16 into twenty-four equal parts. When the piece of butter is laid upon the wrapper 10 preparatory to being wrapped it will be placed transversely of said wrapper with its ends even with the lines 15 and 16, said lines being printed or otherwise inscribed upon the wrapper. Assuming this piece of butter weighs four ounces, after the wrapper 10 has been applied thereto in the proper manner, consecutively cutting off transverse slices therefrom along said lines 11 will cut off approximately a teaspoonful of butter each time a cut is made. Farther in from the end of the sheet are graduated markings 18 spaced farther apart so as to indicate fractions of a cup of butter in terms of eighths, three teaspoonfuls being considered the equivalent of one tablespoonful and twice that amount one-eighth of a cup. The space 17 is reserved for advertising matter.

In Fig. 5 is shown a wrapped cube of butter 24 and in Fig. 4 a conventional butter carton 25 with end flaps 26 and 27 opened out to expose one of the contained pieces of butter 24. It is to be understood that, when the four bars of butter, which fit snugly within the carton, are pressed into place therewithin, such pressure, together with the pressure of the packed cartons upon each other, will act upon the graduated portions of the wrappers 10 and will automatically cause the embossed lines or creases (whichever are used) in the wrappers to make the desired cut indicating markings upon the butter bars, so that these impressed markings will serve to guide the user in slicing off the indicated amounts of butter even after the wrappers 10 may have been removed. When the butter bars are sliced while in the wrapped condition, the slicing knife may readily cut near the indicating lines. However, said paper is thick enough and is sufficiently sized to give it enough rigidity to transfer its markings or embossings plainly to the butter when brought in contact with it under a moderate amount of pressure.

This invention is particularly useful for customers who purchase less than a full pound at a time. In this case the butter bars purchased will often be withdrawn from the carton and sold separately therefrom and the purchasers will not have at hand any of the cartons with cut indicating marks on them which have been devised prior to the cut indicating wrappers afforded by this invention.

In Fig. 5 is shown a proper position for the wrapper 10 of an individual butter bar 24 after said bar has been wrapped therein. Said wrapper is applied in such a manner that it will begin to unwrap in a right hand manner from the upper face of the bar as seen in this view, and when it has been unwrapped down to the innermost layers upon which are inscribed the markings 11, said markings will extend along the side of the exposed strip of butter surface, as seen in said view. Indicia to guide the operator in cutting off butter slices of the desired, predetermined thickness will thus be afforded in the proper position to guide his eye in an unmistakable manner.

It should be understood that the present disclosure is for the purpose of illustration only and that this invention includes all modifications and equivalents which fall within the scope of the subject matter claimed.

What is claimed is:

1. A wrapper sheet for prismatic bodies of butter and the like and consisting of a rectangular sheet of foldable material having one edge dimension substantially longer than the prism to be wrapped and its other edge dimension slightly greater than the sum of the widths of the sides of the prism to be wrapped, said sheet having a series of evenly spaced ribs on its inner face extending inwardly from the first mentioned edge with the terminal ribs of the series spaced uniformly from respective ends of said edge, the space between said terminal ribs being equal to the length of the prism to be wrapped.

2. A wrapper sheet for prismatic bodies of butter and the like and consisting of a rectangular sheet of foldable material having one edge dimension substantially longer than the prism to be wrapped and its other edge dimension slightly greater than the sum of the widths of the sides of the prism to be wrapped, said sheet having a series of evenly spaced ribs on its inner face extending inwardly from the first mentioned edge with the terminal ribs of the series spaced uniformly from respective ends of said edge, the space between said terminal ribs being equal to the length of the prism to be wrapped, said sheet having on its outer face quantitative indicia associated with the location of certain of said ribs.

STEPHEN R. MILLAR.